US012393752B1

(12) United States Patent
Lin et al.

(10) Patent No.: US 12,393,752 B1
(45) Date of Patent: Aug. 19, 2025

(54) METHOD AND SYSTEM FOR GENERATING OPTIMIZED POWER CONVERTER DESIGN BASED ON MULTIMODAL LARGE LANGUAGE MODELS

(71) Applicant: Zhejiang University—University of Illinois Urbana-Champaign Institute, ZJUI, Haining (CN)

(72) Inventors: Fanfan Lin, Haining (CN); Xinze Li, Fayetteville, AR (US)

(73) Assignee: Zhejiang University—University of Illinois Urbana-Champaign Institute, ZJUI (CN)

( * ) Notice: Subject to any disclaimer, the term of this patent is extended or adjusted under 35 U.S.C. 154(b) by 0 days.

(21) Appl. No.: 19/213,847

(22) Filed: May 20, 2025

(51) Int. Cl.
| | |
|---|---|
| G06F 30/27 | (2020.01) |
| G06F 30/30 | (2020.01) |
| G06F 30/337 | (2020.01) |
| G06F 30/373 | (2020.01) |
| G06N 20/00 | (2019.01) |
| G06F 30/38 | (2020.01) |
| G06F 119/06 | (2020.01) |

(52) U.S. Cl.
CPC ............ *G06F 30/337* (2020.01); *G06F 30/27* (2020.01); *G06F 30/373* (2020.01); *G06F 30/38* (2020.01); *G06F 2119/06* (2020.01); *G06N 20/00* (2019.01)

(58) Field of Classification Search
None
See application file for complete search history.

(56) References Cited

FOREIGN PATENT DOCUMENTS

| CN | 109149943 A | * | 1/2019 | ........ H02M 3/33569 |
|---|---|---|---|---|
| CN | 116450100 A | * | 7/2023 | ............... G06F 8/24 |
| CN | 118568245 A | * | 8/2024 | ............. G06F 30/20 |
| WO | WO-2020185207 A1 | * | 9/2020 | ............. G06N 3/047 |

OTHER PUBLICATIONS

Z. Yang et al., "Investigating Grey-Box Modeling for Predictive Analytics in Smart Manufacturing," Proc. of the ASME 2017 Int'l Design Engineering Technical Conferences and Computers and Information in Engineering Conference (IDETC/CIE), pp. 1-10. (Year: 2017).*

(Continued)

*Primary Examiner* — Leigh M Garbowski
(74) *Attorney, Agent, or Firm* — Jason C. Cameron

(57) ABSTRACT

A system and a method for generating an optimized power converter design based on one or more multimodal large language models (MLLMs) are disclosed. The system obtains structured design data, one or more user queries, one or more design parameters, and real-time power converter design data. The system performs a similarity matching between one or more embeddings associated with the structured design data, and the one or more user queries and the one or more design parameters to compute an utmost similarity score. The system retrieves one or more similar document chunks. The system processes the one or more user queries and the one or more design parameters to extract one or more parameters. The system determines one or more design workflows based on the one or more parameters. The system executes at least one design workflow. The system visualizes design outcomes, simulation results, and prediction results to a user.

20 Claims, 7 Drawing Sheets

(56) References Cited

OTHER PUBLICATIONS

X. Li et al., "Artificial-Intelligence-Based Design for Circuit Parameters of Power Converters," IEEE Trans. on Industrial Electronics, vol. 69, No. 11, Nov. 2022, pp. 11144-11155. (Year: 2022).*

I.-C. Gros et al., "Artificial Intelligence (AI)-based optimization of power electronic converters for improved power system stability and performance," 2023 IEEE 14th Int'l Symposium on Diagnostics for Electrical Machines, Power Electronics and Drives (SDEMPED), pp. 204-210. (Year: 2023).*

Y. Chang et al., "A Survey on Evaluation of Large Language Models," ACM Trans. Intell. Syst. Technol., vol. 15, No. 3, Article 39, Mar. 2024, 45 pages. (Year: 2024).*

\* cited by examiner

METHOD AND SYSTEM FOR GENERATING OPTIMIZED POWER CONVERTER DESIGN BASED ON MULTIMODAL LARGE LANGUAGE MODELS

CROSS-REFERENCE TO RELATED APPLICATIONS

This application claims the priority to incorporates by reference the entire disclosure of Chinese Application Serial Number 202411238351.6, filed on Sep. 5, 2024, titled "A method and a device for automatic design of power converter based on multi-modal large language model system"

TECHNICAL FIELD

Embodiments of the present disclosure relate to power converter designs, and more particularly relates to a method and a system for generating an optimized power converter design based on one or more multimodal large language models (MLLMs).

BACKGROUND

Power converters play a crucial role in modern electrical systems by enabling an efficient conversion and control of electrical energy. Traditional methods for designing circuits and modulation strategies in one or more power converters rely on analytical modeling and manual calculations, which are labor-intensive, time-consuming, and may not yield optimal results.

Recent advancements in artificial intelligence (AI) have introduced one or more large language models (LLMs) to assist in various design tasks and show enormous potential. However, applications of the existing one or more LLMs to power converter design present several challenges.

First, the existing one or more LLMs lack expertise in power electronics. The existing one or more LLMs are trained on broad, general-purpose datasets and lack a deep understanding of the power electronics domains. As a result, the existing one or more LLMs struggle to provide accurate technical recommendations and decision-making support for specific power converter designs.

Second, the existing one or more LLMs cannot effectively process unstructured data in the power electronics domains and provide meaningful design insights. The power converter designs involve a substantial amount of the unstructured data, such as time-series operational waveforms and frequency spectrum. The existing one or more LLMs have significant limitations in processing the unstructured data and are unable to be effectively applied in scenarios that require advanced power electronics analysis and physics-aware modeling.

Third, the existing one or more LLMs are isolated from the power converter design workflows. While modern power converter design workflows heavily rely on simulation tools such as MATLAB®, PLECS®, and Ansys®, general-purpose one or more LLMs lack the ability to seamlessly integrate into the power converter design workflows. This isolation creates inefficiencies, as engineers must manually transfer insights, data, and design outcomes between the recommendations of the one or more LLMs and simulation tools. This inefficiency reduces productivity and limits the practical usability of the one or more LLMs in real-world power converter design.

In the existing technology, Chinese patent CN109149943A discloses a parameter optimization design method for LLC resonant converters based on a Cuckoo Search Algorithm. The LLC resonant converter comprises a square wave generator, a resonant network, a high-frequency transformer, and a rectification network, which are connected in sequence. The existing method involves the following steps: Firstly, utilize a fundamental harmonic analysis method to derive an equivalent circuit of the LLC resonant converter. Secondly, to establish the constraints between the resonant inductor and the magnetizing inductor in the equivalent circuit. Thirdly, to construct the fitness function for the Cuckoo Search Algorithm, determining optimal values for the resonant inductor and magnetizing inductor using the algorithm, and subsequently calculating a value of the resonant capacitor. However, the Cuckoo Search Algorithm only optimizes specific circuit parameters (e.g., resonant inductor, magnetizing inductor, and resonant capacitor). The Cuckoo Search Algorithm does not optimize other critical design aspects such as control strategies and modulation techniques, thermal performance, switching losses, and comprehensive efficiency improvements across varying load conditions. The existing method is not integrated with simulation and real-time data. The Cuckoo Search Algorithm is static, follows predefined rules, and does not learn and adapt based on historical design data and user preferences.

Therefore, there is a need for a method and a system in order to address the aforementioned issues by integrating the one or more LLMs with the power converter design workflows to enhance automation, efficiency, and accuracy.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a method for generating an optimized power converter design based on one or more multimodal large language models (MLLMs) is disclosed. In the first step, the method includes obtaining, by one or more hardware processors through a data obtaining subsystem, structured design data related to one or more power converters from one or more databases to create a multimodal knowledge base and at least one of: one or more user queries, one or more design parameters, and real-time power converter design data, from a user associated with a user profile through a user interface to initiate one or more design workflows. The real-time power converter design data, including at least one of: time-series waveform data and tabular performance data. The real-time power converter design data is configured to fine-tune one or more large language models (LLMs). The one or more LLMs are executed using at least one of: a generative pre-trained transformer (GPT)-3.5, a generative pre-trained transformer (GPT)-4, and one or more systems using a large language model (LLM) with a transformer architecture.

The structured design data comprises at least one of: predefined circuit schematics, component libraries, control strategies, historical performance data, academic papers, techno-legal documents, technical documents, datasheets, research papers, simulation logs, modulation strategies, design constraints, and waveform signal data. The one or more user queries comprise at least one of: requests for executing the one or more design workflows, comparing multiple circuit configurations for performance evaluation, selecting the optimal component selections for the one or more power converter objectives and constraints, and generating predictive insights on a performance based on simulation results. The one or more design parameters comprise at least one of: power level, efficiency requirements, switching frequency constraints, voltage and current ratings, load characteristics and dynamic response requirements, thermal dissipation limits, control strategies and modulation techniques, and the one or more circuit design constraints.

The data obtaining subsystem further comprises: a) processing at least one of: the structured design data and the real-time power converter design data using at least one of: embedding techniques and chunking mechanisms to generate a document vector database with one or more document embeddings for efficient retrieval and analysis and b) processing at least one of: the one or more user queries and the one or more design parameters using the embedding techniques to generate a query vector database with one or more query embeddings.

In the next step, the method includes performing, by the one or more hardware processors through a retrieval-augmented generation (RAG) subsystem, a similarity matching between one or more embeddings associated with the structured design data and at least one of: the one or more user queries and the one or more design parameters to compute an utmost similarity score. The performing similarity matching between the one or more embeddings comprises performing the similarity matching between the one or more document embeddings and the one or more query embeddings using at least one of: cosine similarity procedures, Jaccard similarity procedures, levenshtein distance procedures, and correlation procedures to compute the utmost similarity score, thereby retrieving one or more similar document chunks. The one or more similar document chunks comprise component specifications and characteristics, circuit topologies and design principles, simulation models and validation data, performance metrics and optimization techniques, and application-specific information.

In the next step, the method includes retrieving, by the one or more hardware processors through a chunks retrieving subsystem, the one or more similar document chunks similar to at least one of: the one or more user queries and the one or more design parameters based on the utmost similarity score.

In the next step, the method includes processing, by the one or more hardware processors through a data processing subsystem, at least one of: the one or more user queries and the one or more design parameters using one or more natural language processing techniques to extract one or more parameters. The one or more parameters comprise at least one of: one or more technical keywords, one or more numerical values, one or more waveform features, and one or more circuit design constraints.

In the next step, the method includes determining, by the one or more hardware processors through a workflow determining subsystem, the one or more design workflows based on the extracted one or more parameters. The one or more design workflows comprise at least one of: generation of one or more power converter designs, simulation validation for evaluating circuit performance, and fine-tuning at least one of: one or more first-box models and one or more second-box models associated with a surrogate model repository, for continuous optimization.

The surrogate model repository comprises at least one of: a) the one or more first-box models trained on the historical power converters design data, configured to leverage one or more data-driven artificial intelligence (AI) models to generate the optimized design of the one or more power converters, b) the one or more second-box models configured with physics-informed artificial intelligence (AI) models to optimize the results accuracy for circuit performance, an electromagnetic interference (EMI) analysis, and a thermal dissipation, and c) one or more third-box models configured to represent at least one of: one or more physical models and one or more mathematical models of the one or more power converters, including at least one of: analytical equations, state-space models, and frequency-domain representations.

In the next step, the method includes executing, by the one or more hardware processors through a task execution subsystem configured with the one or more MLLMs, at least one design workflow within the one or more design workflows based on the extracted one or more parameters. The executing at least one design workflow, further comprising at least one of: a) generating, by the one or more hardware processors through a design generation subsystem, the one or more power converter designs based on the one or more similar document chunks.

Optimizing the generated one or more power converter designs by adapting one or more meta-heuristic optimization models using the surrogate model repository to determine design outcomes that comprise at least one of: circuit parameter values, control strategies and values, modulation parameter values, and component selections. Optimizing the one or more power converter designs based on one or more performance metrics. The one or more performance metrics comprise at least one of: current stress, zero-voltage switching range, zero-current switching range, reactive power, efficiency, reverse current, direct current (DC) bias, output voltage ripple, output current ripple, and transient response, b) performing, by the one or more hardware processors through a power converter validation subsystem, the simulation validation on the generated one or more power converter designs using one or more pre-defined simulation repositories to generate simulation results to evaluate the circuit performance, and c) performing, by the one or more hardware processors through a model fine-tuning subsystem, the fine-tuning of at least one of: the one or more first-box models and the one or more second-box models associated with the surrogate model repository, based on utilizing the real-time power converter design data to generate prediction results.

The one or more pre-defined simulation repositories include one or more auto-initialization of power electronics simulation tools. The one or more auto-initialization of power electronics simulation tools comprise at least one of: a) one or more circuit-level simulation tools configured to evaluate the circuit performance of the generated one or more power converters, b) one or more multi-physics simulation tools configured to perform at least one of: a thermal analysis, an electromagnetic analysis, and a mechanical analysis, and c) one or more finite element analysis (FEA) tools configured to determine physical interactions within one or more components associated with the one or more power converters.

In the next step, the method includes visualizing, by the one or more hardware processors through a data visualizing subsystem, at least one of: the design outcomes, the simulation results, and the prediction results to the user for at least one of: the component selections in the generated one or more power converter designs, comparing multiple design variations of the one or more power converters and power converter performance metrics, to generate the optimized power converter design.

In accordance with another embodiment of the present disclosure, a system for generating the optimized power converter design based on the one or more MLLMs is disclosed. The system comprises the one or more hardware processors and a memory unit. The memory unit is coupled to the one or more hardware processors, wherein the memory unit comprises a plurality of subsystems in form of programmable instructions executable by the one or more hardware processors. The plurality of subsystems comprises the data obtaining subsystem, the RAG subsystem, the chunks retrieving subsystem, the data processing subsystem, the workflow determining subsystem, the task execution subsystem, the design generation subsystem, the power converter validation subsystem, the model fine-tuning subsystem, and the data visualizing subsystem.

Yet in another embodiment, the data obtaining subsystem is configured to obtain: a) the structured design data related to the one or more power converters from the one or more databases to create the multimodal knowledge base, and b) at least one of: the one or more user queries, the one or more design parameters, and the real-time power converter design data, from the user associated with the user profile through the user interface to initiate the one or more design workflows. The real-time power converter design data, including at least one of: the time-series waveform data and the tabular performance data, is configured to fine-tune the one or more LLMs.

Yet in another embodiment, the RAG subsystem is configured to perform the similarity matching between the one or more embeddings associated with the structured design data and at least one of: the one or more user queries and the one or more design parameters to compute the utmost similarity score.

Yet in another embodiment, the chunks retrieving subsystem is configured to retrieve the one or more similar document chunks similar to at least one of: the one or more user queries and the one or more design parameters based on the utmost similarity score.

Yet in another embodiment, the data processing subsystem is configured to process at least one of: the one or more user queries and the one or more design parameters using the one or more natural language processing techniques to extract the one or more parameters. The one or more parameters comprise at least one of: the one or more technical keywords, the one or more numerical values, the one or more waveform features, and the one or more circuit design constraints.

Yet in another embodiment, the workflow determining subsystem is configured to determine the one or more design workflows based on the extracted one or more parameters. The one or more design workflows comprise at least one of: generation of the one or more power converter designs, the simulation validation for evaluating the circuit performance, and fine-tuning at least one of: the one or more first-box models and the one or more second-box models associated with the surrogate model repository, for continuous optimization.

Yet in another embodiment, the task execution subsystem is configured with the one or more MLLMs to execute at least one design workflow within the one or more design workflows based on the extracted one or more parameters. The executing at least one design workflow, further comprising at least one of: a) the design generation subsystem configured to generate the one or more power converter designs based on the one or more similar document chunks.

Optimizing the generated one or more power converter designs by adapting the one or more meta-heuristic optimization models using the surrogate model repository to determine design outcomes that comprise at least one of: the circuit parameter values, the control strategies and values, the modulation parameter values, and the component selections, b) the power converter validation subsystem configured to perform the simulation validation on the generated one or more power converter designs using the one or more pre-defined simulation repositories to generate the simulation results to evaluate the circuit performance, and c) the model fine-tuning subsystem configured to perform the fine-tuning of at least one of: the one or more first-box models and the one or more second-box models associated with the surrogate model repository, based on utilizing the real-time power converter design data to generate the prediction results.

Yet in another embodiment, the data visualizing subsystem is configured to visualize at least one of: the design outcomes, the simulation results, and the prediction results to the user for at least one of: the component selections in the generated one or more power converter designs, comparing the multiple design variations of the one or more power converters and the power converter performance metrics, to generate the optimized power converter design.

In accordance with another embodiment of the present disclosure, a non-transitory computer-readable storage medium storing computer-executable instructions that, when executed by the one or more hardware processors, cause the one or more hardware processors to perform operations for generating the optimized power converter design based on the one or more MLLMs is disclosed. The operations comprise: a) obtaining the structured design data related to the one or more power converters from the one or more databases to create the multimodal knowledge base, b) obtaining at least one of: the one or more user queries, the one or more design parameters, and the real-time power converter design data, from the user associated with the user profile through the user interface to initiate the one or more design workflows. The real-time power converter design data, including at least one of: the time-series waveform data and the tabular performance data, configured to fine-tune the one or more LLMs, c) performing the similarity matching between the one or more embeddings associated with the structured design data and at least one of: the one or more user queries and the one or more design parameters to compute the utmost similarity score, d) retrieving the one or more similar document chunks similar to at least one of: the one or more user queries and the one or more design parameters based on the utmost similarity score, e) processing at least one of: the one or more user queries and the one or more design parameters using the one or more natural language processing techniques to extract the one or more parameters. The one or more parameters comprise at least one of: the one or more technical keywords, the one or more numerical values, the one or more waveform features, and the one or more circuit design constraints, f) determining the one or more design workflows based on the extracted one or more parameters. The one or more design workflows comprise at least one of: generation of the one or more power converter designs, the simulation validation for evaluating the circuit performance, and fine-tuning at least one of: the one or more first-box models and the one or more second-box models associated with the surrogate model repository, for the continuous optimization, g) executing using the one or more MLLMs at least one design workflow within the one or more design workflows based on the extracted one or more parameters. The executing at least one design workflow, further comprising at least one of: $g_1$) generating the one or more power converter designs based on the one or more similar document chunks. Optimizing the generated one or more power converter designs by adapting the one or more meta-heuristic optimization models using the surrogate model repository to determine the design outcomes that comprise at least one of: the circuit parameter values, the control strategies and values, the modulation parameter values, and the component selections, $g_2$) performing the simulation validation on the generated one or more power converter designs using the one or more pre-defined simulation repositories to generate the simulation results to evaluate the circuit performance, and $g_3$) performing the fine-tuning of at least one of: the one or more first-box models and the one or more second-box models associated with the surrogate model repository, based on utilizing the real-time power converter design data to generate the prediction results, and h) visualizing at least one of: the design outcomes, the simulation results, and the prediction results to the user for at least one of: the component selections in the generated one or more power converter designs, comparing the multiple design variations of the one or more power converters and the power converter performance metrics, to generate the optimized power converter design.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limited in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
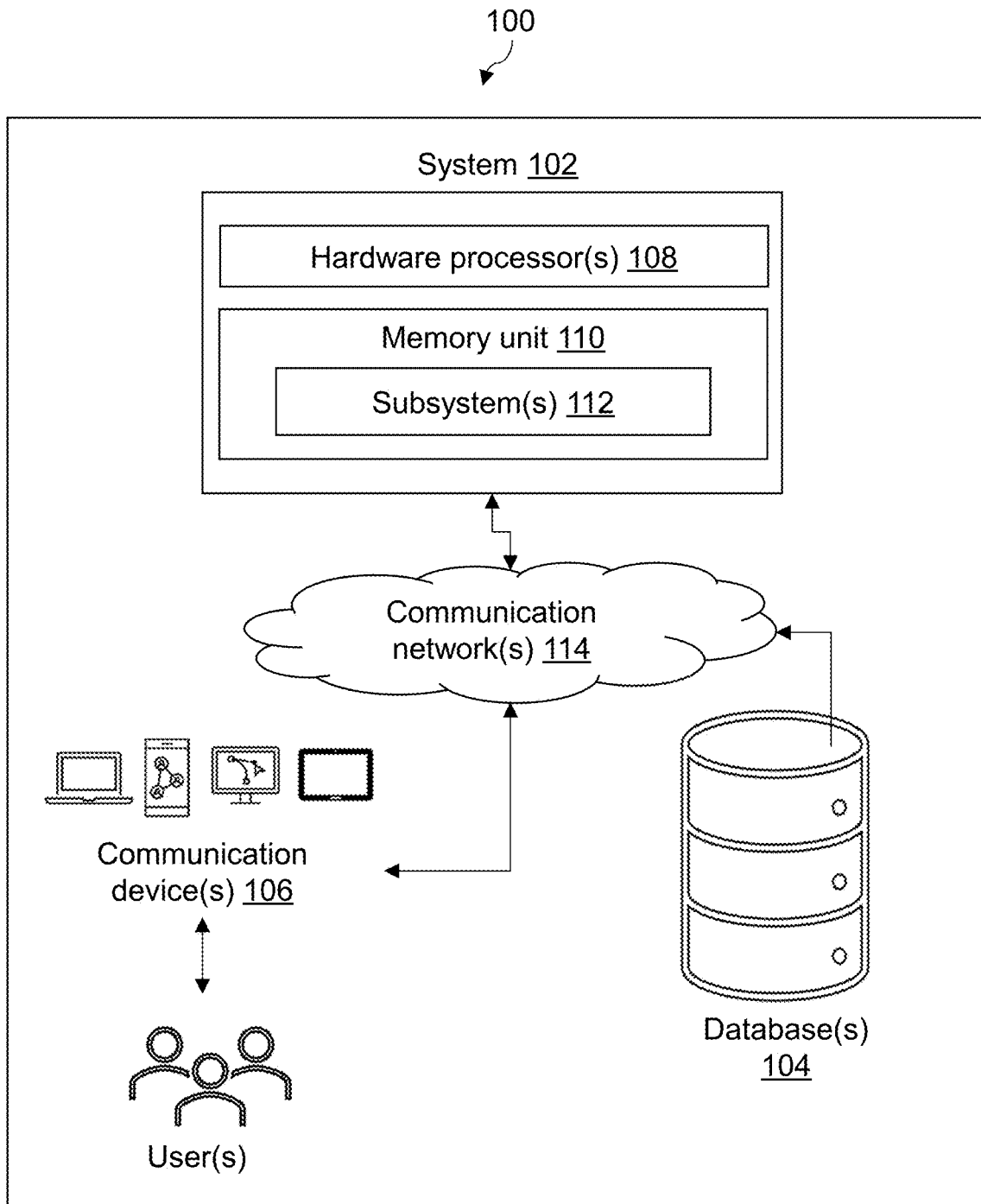
FIG. 1 illustrates an exemplary block diagram representation of a network architecture depicting a system for generating an optimized power converter design based on one or more multimodal large language models (MLLMs), in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 1 through FIG. 4, where similar reference characters denote corresponding features consistently throughout the figures, there are shown preferred embodiments, and these embodiments are described in the context of the following exemplary system and/or method.

FIG. 1 illustrates an exemplary block diagram representation of a network architecture 100 depicting a system 102 for generating an optimized power converter design based on one or more multimodal large language models (MLLMs), in accordance with an embodiment of the present disclosure.

According to an exemplary embodiment of the present disclosure, FIG. 1 depicts the network architecture 100 that may include the system 102, one or more databases 104, and one or more communication devices 106. The system 102, the one or more databases 104, and the one or more communication devices 106 may be communicatively coupled via one or more communication networks 114, ensuring seamless data transmission, processing, and decision-making. The system 102 acts as a central processing unit within the network architecture 100, responsible for generating the optimized power converter design based on the one or more MLLMs. The system 102 is configured to execute a set of computer-readable instructions that control a plurality of subsystems 112.

In an exemplary embodiment, the system 102 comprises one or more hardware processors 108 and a memory unit 110. The memory unit 110 is operatively connected to the one or more hardware processors 108. The memory unit 110 comprises a set of computer-readable instructions in form of the plurality of subsystems 112, configured to be executed by the one or more hardware processors 108. The one or more hardware processors 108 may comprise a combination of discrete components, an integrated circuit, an application-specific integrated circuit, a field-programmable gate array, a digital signal processor, or other suitable hardware. The "software" may comprise one or more objects, agents, threads, lines of code, subroutines, separate software applications, two or more lines of code, or other suitable software structures operating in one or more software applications or the one or more hardware processors 108.

In an exemplary embodiment, the one or more hardware processors 108 may include, for example, microprocessors, microcomputers, microcontrollers, digital signal processors, central processing units, state machines, logic circuits, and/or any devices that manipulate data or signals based on operational instructions. Among other capabilities, the one or more hardware processors 108 may fetch and execute computer-readable instructions in the memory unit 110 operationally coupled with the system 102 for performing tasks such as executing one or more design workflows, input/output processing, and/or any other functions. Any reference to a task in the present disclosure may refer to an operation or that may be performed on at least one of: one or more user queries and one or more design parameters from a user associated with a user profile. The one or more hardware processors 108 are high-performance processors capable of handling large volumes of structured design data related to one or more power converters and complex computations. The one or more hardware processors 108 may be, but not limited to, at least one of: multi-core central processing units (CPU), a graphics processing unit (GPU)-based processing unit, and the like that enhance an ability of the system 102 to generate the optimized power converter design.

In an exemplary embodiment, the one or more databases 104 may be configured to store and manage data related to various aspects of the system 102. The one or more databases 104 may store at least one of, but not limited to, the structured design data, real-time power converter design data, one or more user queries and one or more design parameters, simulation and validation datasets, machine learning model parameters, machine learning model embeddings, a multimodal knowledge base 244, one or more meta-heuristic optimization models, and the like. The one or more databases 104 serve as a centralized repository for critical data elements that are integral to the secure operation of the system 102, enabling efficient management and synchronization of data associated with the system 102. The one or more databases 104 enable the system 102 to dynamically retrieve, analyze, and update the stored data in real-time, for generating the optimized design of the one or more power converters. The one or more databases 104 may include different types of databases such as, but not limited to, relational databases (e.g., Structured Query Language (SQL) databases), non-Structured Query Language (NoSQL) databases (e.g., MongoDB, Cassandra), time-series databases (e.g., InfluxDB), an OpenSearch database, object storage systems, lender criteria database, and the like. The one or more databases 104 facilitate efficient storage, retrieval, and updating of design knowledge, ensuring that the system 102 is able to dynamically adapt to new power converter requirements and optimize designs based on evolving design constraints.

In an exemplary embodiment, the one or more communication devices 106 are configured to enable the user to interact with the system 102. The one or more communication devices 106 may be digital devices, computing devices, and/or networks. The one or more communication devices 106 may include, but not limited to, a mobile device, a smartphone, a personal digital assistant (PDA), a tablet computer, a phablet computer, a wearable computing device, a virtual reality/augmented reality (VR/AR) device, a laptop, a desktop, and the like. The one or more communication devices 106 are configured with a user interface configured to enable seamless interaction between the user and the system 102. The user interface may include the graphical user interface (GUI) units, voice-based interfaces, and touch-based interfaces, depending on the capabilities of the system 102 being used. The GUI units may be configured to display outputs, including, but not restricted to, at least one of: design outcomes, simulation results, and prediction results to the user. The one or more communication devices 106 may also support multimodal inputs, allowing the user to interact through voice commands, text inputs, and gesture-based controls, ensuring accessibility and ease of use across different user demographics. The one or more communication devices 106 are configured to securely transmit and receive data to and from the system 102 via the one or more communication networks 114, ensuring seamless user experience and real-time synchronization.

In an exemplary embodiment, the one or more communication networks 114 may be, but not limited to, a wired communication network and/or a wireless communication network, a local area network (LAN), a wide area network (WAN), a Wireless Local Area Network (WLAN), a metropolitan area network (MAN), a telephone network, such as the Public Switched Telephone Network (PSTN) or a cellular network, an intranet, the Internet, a fiber optic network, a satellite network, a cloud computing network, a combination of networks, and the like. The wired communication network may comprise, but not limited to, at least one of: Ethernet connections, Fiber Optics, Power Line Communications (PLCs), Serial Communications, Coaxial Cables, Quantum Communication, Advanced Fiber Optics, Hybrid Networks, and the like. The wireless communication network may comprise, but not limited to, at least one of: wireless fidelity (wi-fi), cellular networks (including fourth generation (4G) technologies and fifth generation (5G) technologies), Bluetooth®, ZigBee®, long-range wide area network (LoRaWAN), satellite communication, radio frequency identification (RFID), 6G (sixth generation) networks, advanced IoT protocols, mesh networks, non-terrestrial networks (NTNs), near field communication (NFC), and the like.

In an exemplary embodiment, the system 102 may be implemented by way of a single device or a combination of multiple devices that may be operatively connected or networked together. The system 102 may be implemented in hardware or a suitable combination of hardware and software.

Though few components and the plurality of subsystems 112 are disclosed in FIG. 1, there may be additional components and subsystems which is not shown, such as, but not limited to, ports, routers, repeaters, firewall devices, network devices, the one or more databases 104, network attached storage devices, assets, machinery, instruments, facility equipment, emergency management devices, image capturing devices, any other devices, and combination thereof. The person skilled in the art should not be limiting the components/subsystems shown in FIG. 1. Although FIG. 1 illustrates the system 102, and the one or more communication devices 106 connected to the one or more databases 104, one skilled in the art may envision that the system 102, and the one or more communication devices 106 may be connected to several user devices located at various locations and several databases via the one or more communication networks 114.

Those of ordinary skilled in the art will appreciate that the hardware depicted in FIG. 1 may vary for particular implementations. For example, other peripheral devices such as an optical disk drive and the like, the local area network (LAN), the wide area network (WAN), wireless (e.g., wireless-fidelity (Wi-Fi)) adapter, graphics adapter, disk controller, input/output (I/O) adapter also may be used in addition or place of the hardware depicted. The depicted example is provided for explanation only and is not meant to imply architectural limitations concerning the present disclosure.

Those skilled in the art will recognize that, for simplicity and clarity, the full structure and operation of all data processing systems suitable for use with the present disclosure are not being depicted or described herein. Instead, only so much of the system 102 as is unique to the present disclosure or necessary for an understanding of the present disclosure is depicted and described. The remainder of the construction and operation of the system 102 may conform to any of the various current implementations and practices that are known in the art.

Figure 2A:
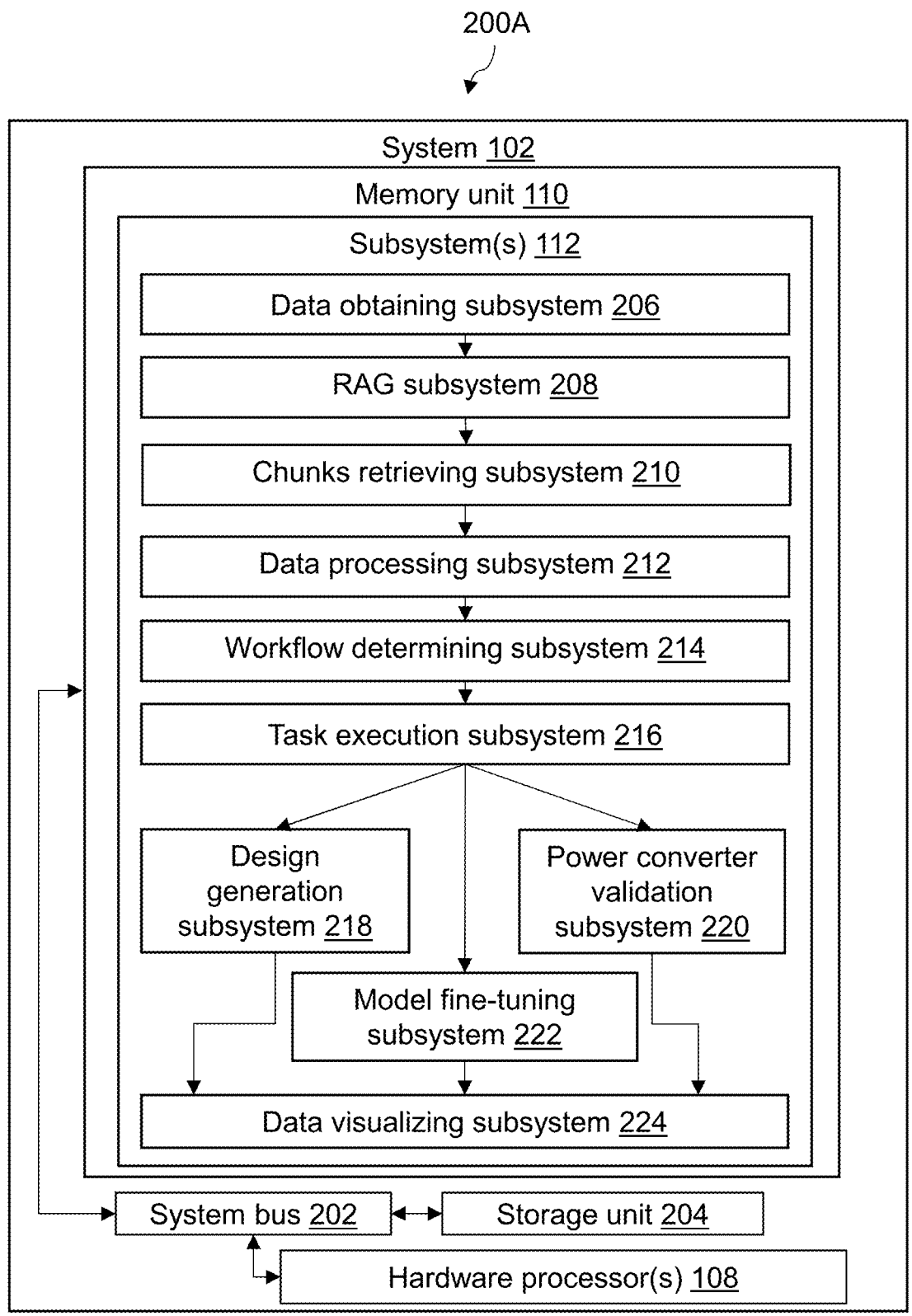
FIG. 2A illustrates an exemplary block diagram representation of the system as shown in FIG. 1 for generating the optimized power converter design based on the one or more MLLMs, in accordance with an embodiment of the present disclosure.
Figure 2B:
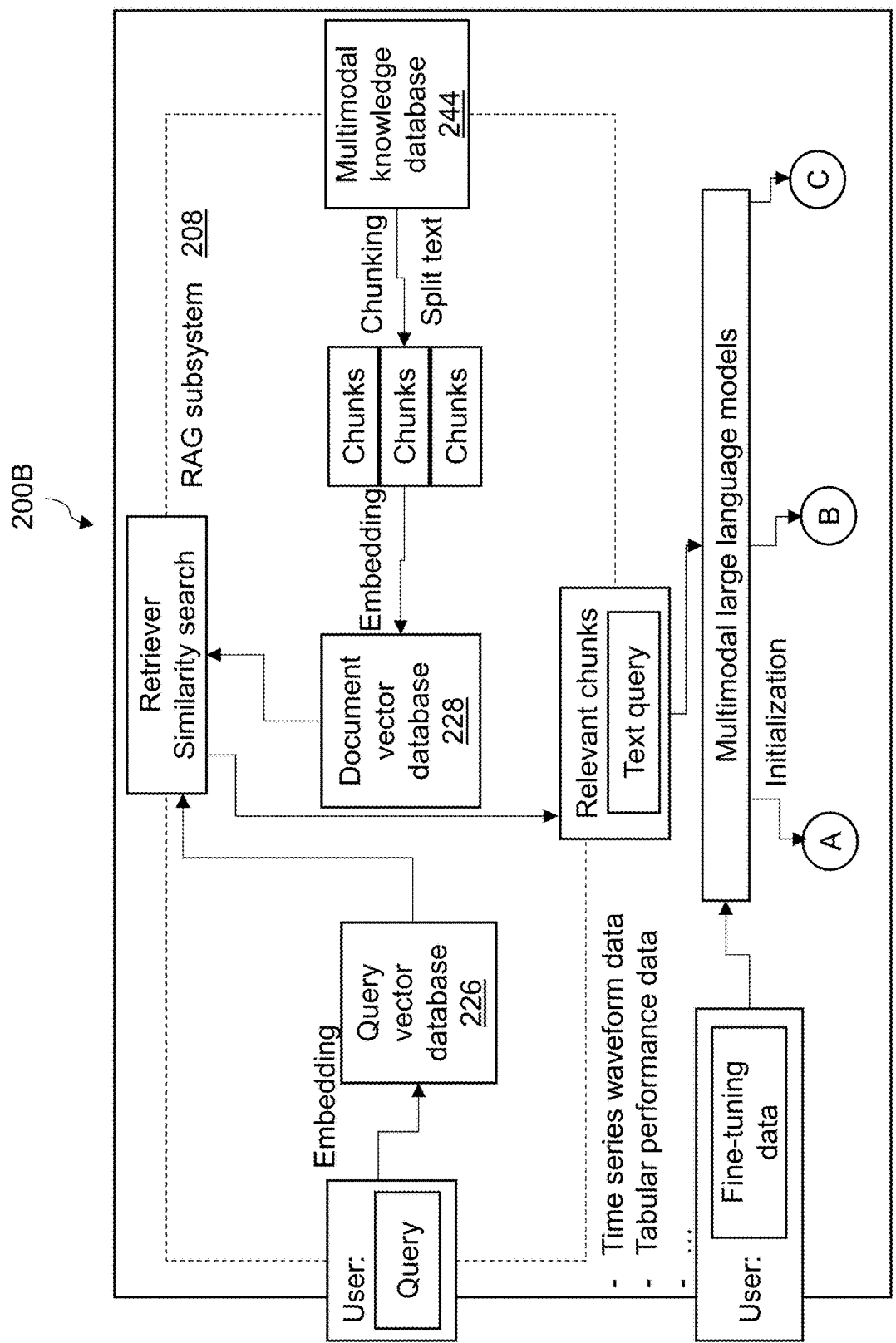
FIG. 2B illustrates an exemplary flow diagram representation of the system as shown in FIG. 2A for generating the optimized power converter design based on the one or more MLLMs, in accordance with an embodiment of the present disclosure.
Figure 2B:
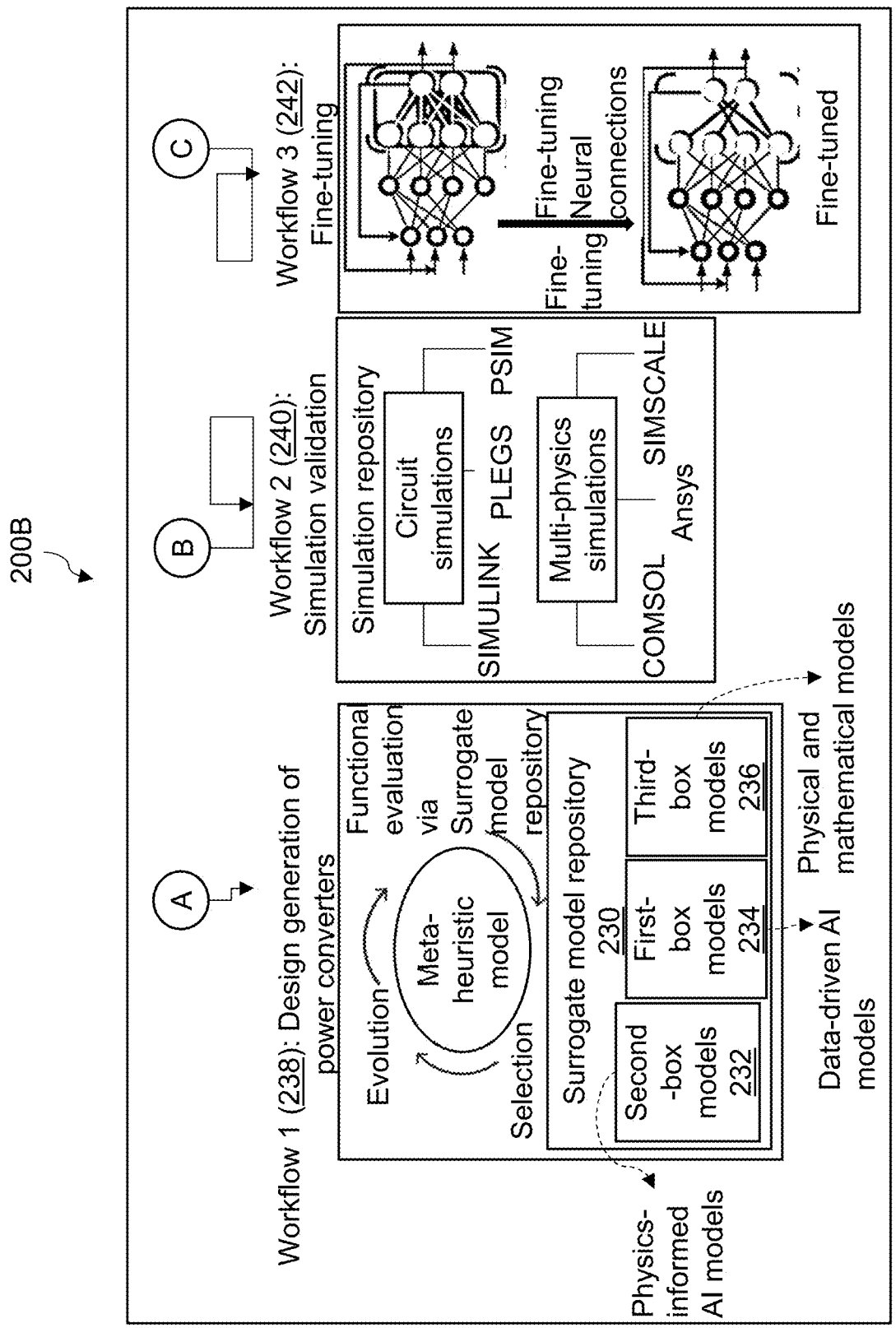

FIG. 2A illustrates an exemplary block diagram representation 200A of the system 102 as shown in FIG. 1 for generating the optimized power converter design based on the one or more MLLMs, in accordance with an embodiment of the present disclosure; and FIG. 2B illustrates an exemplary flow diagram representation 200B of the system 102 as shown in FIG. 2A for generating the optimized power converter design based on the one or more MLLMs, in accordance with an embodiment of the present disclosure.

In an exemplary embodiment, the system 102 comprises the one or more hardware processors 108, the memory unit 110, and a storage unit 204. The one or more hardware processors 108, the memory unit 110, and the storage unit 204 are communicatively coupled through a system bus 202 or any similar mechanism. The system bus 202 functions as the central conduit for data transfer and communication between the one or more hardware processors 108, the memory unit 110, and the storage unit 204. The system bus 202 facilitates the efficient exchange of information and instructions, enabling the coordinated operation of the system 102. The system bus 202 may be implemented using various technologies including, but not limited to, parallel buses, serial buses, and high-speed data transfer interfaces such as, but not limited to, at least one of a: universal serial bus (USB), peripheral component interconnect express (PCIe), and similar standards.

In an exemplary embodiment, the memory unit 110 is operatively connected to the one or more hardware processors 108. The memory unit 110 comprises the plurality of subsystems 112 in the form of programmable instructions executable by the one or more hardware processors 108. The plurality of subsystems 112 comprises a data obtaining subsystem 206, a retrieval-augmented generation (RAG) subsystem 208, a chunks retrieving subsystem 210, a data processing subsystem 212, a workflow determining subsystem 214, a task execution subsystem 216, a design generation subsystem 218, a power converter validation subsystem 220, a model fine-tuning subsystem 222, and a data visualizing subsystem 224. The one or more hardware processors 108, as used herein, means any type of computational circuit, such as, but not limited to, the microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 108 may also include embedded controllers, such as generic or programmable logic devices or arrays, application-specific integrated circuits, single-chip computers, and the like.

The memory unit 110 may be the non-transitory volatile memory and the non-volatile memory. The memory unit 110 may be coupled to communicate with the one or more hardware processors 108, such as being a computer-readable storage medium. The one or more hardware processors 108 may execute machine-readable instructions and/or source code stored in the memory unit 110. A variety of machine-readable instructions may be stored in and accessed from the memory unit 110. The memory unit 110 may include any suitable elements for storing data and machine-readable instructions, such as read-only memory, random access memory, erasable programmable read-only memory, electrically erasable programmable read-only memory, a hard drive, a removable media drive for handling compact disks, digital video disks, diskettes, magnetic tape cartridges, memory cards, and the like. In the present embodiment, the memory unit 110 includes the plurality of subsystems 112 stored in the form of machine-readable instructions on any of the above-mentioned storage media and may be in communication with and executed by the one or more hardware processors 108.

The storage unit 204 may be a cloud storage or the one or more databases 104 such as those shown in FIG. 1. The storage unit 204 may store, but not limited to, recommended course of action sequences dynamically generated by the system 102. The action sequences comprise obtaining the structured design data, receiving and processing at least one of: the one or more user queries and the one or more design parameters, performing a similarity matching, determining one or more design workflows, executing at least one design workflow within the one or more design workflows, visualizing at least one of: the design outcomes, the simulation results, and the prediction results to the user, and the like. The storage unit 204 is structured to enable efficient retrieval and management of the multimodal knowledge base 244 and dynamic action sequences. The storage unit 204 supports real-time synchronization with the plurality of subsystems 112 and ensures that the recommendations and action sequences remain accurate and up-to-date. Additionally, the storage unit 204 may retain previous action sequences for comparison and future reference, enabling continuous refinement of the system 102 over time. The storage unit 204 may be any kind of database such as, but not limited to, relational databases, dedicated databases, dynamic databases, monetized databases, scalable databases, cloud databases, distributed databases, any other databases, and a combination thereof.

Furthermore, the storage unit 204 and the one or more databases 104 may integrate with, but not limited to, at least one of: cloud computing platforms, artificial intelligence (AI) model training systems, component libraries & manufacturer databases, circuit design repositories, standards & regulatory databases, simulation & benchmarking repositories, research & technical paper databases, patent & intellectual property databases, engineering forums & technical blogs, time-series waveform & experimental data repositories, and the like. These integrations ensure that the storage unit 204 and the one or more databases 104 remains a central repository for managing data essential to the system 102, enabling dynamic, real-time updates, seamless data flow, and actionable insights for the one or more power converters to generate the optimized design. This interconnected architecture supports the adaptability, scalability, and ability of the system 102 to deliver personalized and accurate recommendations to the user.

In an exemplary embodiment, the data obtaining subsystem 206 is configured to obtain the structured design data related to the one or more power converters from the one or more databases 104 to create the multimodal knowledge base 244. The data obtaining subsystem 206 is further configured to obtain at least one of: the one or more user queries, the one or more design parameters, the real-time power converter design data, and the like from the user. The user is associated with the user profile configured to input at least one of: the one or more user queries, the one or more design parameters, the real-time power converter design data, and the like, through the user interface associated with the one or more communication devices 106. The multimodal knowledge base 244 comprises the structured design data integrated with the real-time power converter design data. The obtained structured design data and user-provided information are configured to initiate one or more design workflows for generating, analyzing, and validating one or more power converter designs within a computer-implemented design environment. The data obtaining subsystem 206 serves as an essential component in facilitating the retrieval and integration of diverse datasets that contribute to generating the one or more power converter designs. The multimodal knowledge base 244 serves as a central repository that enables the RAG subsystem 208 to access, analyze, and optimize the one or more power converter designs based on historical data, real-time operational insights, and Artificial Intelligence (AI)-driven inference mechanisms. The real-time power converter design data is integrated into the multimodal knowledge base 244 to enhance the ability of the system 102 to adapt to changing design requirements and environmental conditions.

The real-time power converter design data may include, but not restricted to, at least one of: time-series waveform data, tabular performance data, and the like. The time-series waveform data is sequential electrical signal data collected over time from one or more components associated with the one or more power converters. The tabular performance data is structured data in table format showing operational metrics such as, but not constricted to, at least one of: efficiency, temperature, voltage levels, and the like. The tabular performance data stores numerical values related to efficiency benchmarks, thermal characteristics, output voltage ripple, electromagnetic interference (EMI), and power quality metrics under different operating conditions.

The real-time power converter design data is configured to fine-tune one or more large language models (LLMs). The one or more LLMs are Artificial Intelligence (AI) models trained on vast amounts of text data to understand and generate human-like language. The one or more LLMs are executed using, but not limited to, at least one of: a generative pre-trained transformer (GPT)-3.5, a generative pre-trained transformer (GPT)-4, one or more systems using a large language model (LLM) with a transformer architecture (deep learning model architecture using attention mechanisms, foundational for modern LLMs), and the like.

The structured design data may comprise, but not restricted to, at least one of: predefined circuit schematics, component libraries, control strategies, historical performance data, academic papers, techno-legal documents, technical documents, datasheets, research papers, simulation logs, modulation strategies, design constraints, waveform signal data, and the like. The predefined circuit schematics include, but not limited to, at least one of: established power converter designs with clearly defined electrical pathways, component interconnections, and voltage/current specifications. The predefined circuit schematics enable the system 102 to identify frequently used designs and the operational characteristics. The component libraries provide detailed information on passive and active electronic components such as resistors, capacitors, inductors, metal-oxide-semiconductor field-effect transistors (MOSFETs), insulated gate bipolar transistors (IGBTs), gate drivers, and the like. The system 102 leverages the component libraries to select suitable components based on efficiency, power ratings, and thermal performance requirements. The control strategies encompass various modulation techniques and digital/analog control methods used in the one or more power converters, including, but not limited to, at least one of: pulse-width modulation (PWM), phase-shift modulation, space vector modulation, resonant control strategies, and model predictive control (MPC). The system 102 utilizes the historical performance data to determine an optimal control scheme for a given power conversion application. The historical performance data comprises, but not constricted to, at least one of: archived simulation results, experimental test reports, and field data from previously deployed power converters. The historical performance data enables the system 102 to compare newly generated one or more power converter designs with past one or more power converter designs and refine the power converter design optimization process accordingly.

The academic papers contain theoretical advancements, research findings, and experimental analyses relevant to the power converter design. The academic papers provide valuable insights into innovative methodologies, efficiency improvements, and emerging trends in power electronics. The techno-legal documents include regulatory compliance standards, safety guidelines, dictate design constraints, and operational limits for the one or more power converters in different applications. The technical documents, which encompass industry white papers, manufacturer application notes, and design recommendations, provide practical implementation guidance for various power conversion architectures. The datasheets provide essential specifications for semiconductor devices, magnetics, capacitors, and other electrical components. The system 102 references the datasheets to evaluate switching characteristics, thermal limitations, and voltage/current ratings during converter optimization. The simulation logs store transient analysis, steady-state performance evaluations, and switching behavior characteristics obtained from electrical and multiphysics simulation environments. The simulation logs enable data-driven (AI) model validations and fine-tuning of the one or more design parameters.

The modulation strategies define the techniques used to regulate power flow and improve performance in the one or more power converters. The system 102 evaluates multiple modulation strategies to identify the most efficient configuration for a given set of design constraints. The design constraints guide the system 102 in selecting an appropriate power converter design that meets application-specific requirements. The waveform signal data represents one of: real-time and simulated electrical behavior of the one or more power converters. The system 102 analyzes the waveform signal data to optimize performance parameters such as efficiency, transient response, and harmonic distortion. By obtaining and processing the structured design data, the data obtaining subsystem 206 plays a crucial role in enhancing the accuracy, adaptability, and efficiency of the RAG subsystem 208.

The one or more user queries may comprise, but not constrained to, at least one of: requests for executing the one or more design workflows, comparing multiple circuit configurations for performance evaluation, selecting the optimal component selections for power converter objectives and constraints, generating predictive insights on a performance based on the simulation results, and the like. The one or more design parameters may comprise, but not limited to, at least one of: power level, efficiency requirements, switching frequency constraints, voltage and current ratings, load characteristics and dynamic response requirements, thermal dissipation limits, control strategies and modulation techniques, the one or more circuit design constraints, and the like.

The data obtaining subsystem 206 is configured to process at least one of: the structured design data and the real-time power converter design data using at least one of: embedding techniques and chunking mechanisms. Based on this processing, the data obtaining subsystem 206 is configured to generate a document vector database 228 comprising one or more document embeddings for efficient retrieval and analysis. The data obtaining subsystem 206 is configured to process at least one of: the one or more user queries and the one or more design parameters using the embedding techniques to generate a query vector database 226 comprising one or more query embeddings for enabling semantically relevant information retrieval from the document vector database 228.

The embedding techniques generate numerical vector representations of at least one of: the structured design data and the real-time power converter design data, enabling the RAG subsystem 208 to identify semantic relationships between distinctive design elements. The chunking mechanisms segment large, unstructured datasets (such as research papers, waveform signal data, and technical documents) into smaller, contextually meaningful units for efficient retrieval. The document vector database 228 is generated from the processed one or more embeddings, allowing the system 102 to rapidly retrieve historical circuit layouts, optimization techniques, and design configurations.

The embedding techniques convert at least one of: the one or more user queries and the one or more design parameters into numerical vectors, ensuring the numerical vectors are compatible with the document vector database 228 for similarity analysis.

In an exemplary embodiment, the RAG subsystem 208 is configured to perform the similarity matching between one or more embeddings associated with the structured design data and at least one of: the one or more user queries and the one or more design parameters. The similarity matching is configured to compute an utmost similarity score. The RAG subsystem 208 is configured to compare the one or more document embeddings against the one or more query embeddings, allowing the RAG subsystem 208 to identify the most relevant one or more design inputs. The one or more document embeddings represent contextualized representations of data chunks that encapsulate design intelligence, while the one or more query embeddings represent user intent and design requirements in a vector space. The RAG subsystem 208 is configured to enable this comparison by employing similarity computation techniques to accurately and efficiently identify content most semantically aligned with the objective of the user.

The similarity computation techniques may include, but not limited to, at least one of: cosine similarity procedures, Jaccard similarity procedures, levenshtein distance procedures, correlation procedures, and the like, to determine the utmost similarity score between the one or more document embeddings and the one or more query embeddings. The cosine similarity procedures are configured to compare an angular difference between vectors, ideal for textual content embeddings. The Jaccard similarity procedures are configured to evaluate set-based similarity, particularly effective when comparing token overlap. The levenshtein distance procedures are configured to measure string similarity based on edit operations, suitable for syntax-aware comparisons. The correlation procedures are configured to identify statistical relationships in vector patterns.

In an exemplary embodiment, the chunks retrieving subsystem 210 is configured to retrieve the one or more similar document chunks that are most relevant and contextually aligned to at least one of: the one or more user queries and the one or more design parameters, based on the utmost similarity score computed by the RAG subsystem 208. The chunks retrieving subsystem 210 is configured to access the document vector database 228 containing the one or more document embeddings and selectively extract the one or more similar document chunks whose one or more document embeddings demonstrate high semantic proximity to the one or more query embeddings, as quantified by the utmost similarity score.

Based on the computed utmost similarity score, the chunks retrieving subsystem 210 is configured to retrieve the one or more similar document chunks which may include, but not limited to, at least one of: a) component specifications and characteristics that define parts used in power converter circuits, b) circuit topologies and design principles that provide structural and operational guidance, c) simulation models and validation data for verifying circuit behavior, d) performance metrics and optimization techniques that aid in improving design efficiency, and e) application-specific information that tailors the one or more power converter designs to real-world use cases such as renewable energy, automotive, and industrial systems. The retrieved one or more design inputs (one or more similar document chunks) are presented to the one or more MLLMs for further processing, optimization, and design generation.

In an exemplary embodiment, the data processing subsystem 212 is configured to process at least one of: the one or more user queries and the one or more design parameters using one or more natural language processing techniques to extract the one or more parameters. The one or more natural language processing techniques are configured to analyze and interpret user inputs in natural language to extract the one or more parameters. The data processing subsystem 212 serves as a crucial component in enabling intelligent interpretation of the user inputs, facilitating the accurate retrieval of relevant design information, and contributing to the automatic generation of the optimized power converter design. The one or more natural language processing techniques utilized by the data processing subsystem 212 ensure that technical requests, numerical constraints, and design specifications are accurately extracted, categorized, and processed for further computation. The one or more parameters comprise, but not restricted to, at least one of: one or more technical keywords, one or more numerical values, one or more waveform features, one or more circuit design constraints, and the like.

In an exemplary embodiment, the workflow determining subsystem 214 is configured to determine the one or more design workflows based on the extracted one or more parameters. The one or more design workflows may comprise, but not restricted to, at least one of: generation of the one or more power converter designs, simulation validation for evaluating circuit performance, and fine-tuning at least one of: one or more first-box models 234 and one or more second-box models 232 associated with a surrogate model repository 230, for continuous optimization. The generation of the one or more power converter designs corresponds to the extracted technical specifications, numerical values, and design constraints. The simulation validation is configured to evaluate the circuit performance under one of: real and simulated conditions for operational accuracy. Additionally, the fine-tuning is performed on at least one of: the one or more first-box models 234 and the one or more second-box models 232 from the surrogate model repository 230. This ensures that the system 102 enables continuous optimization of the design process by dynamically adapting to the user inputs and previously validated performance data, thus creating more efficient and accurate one or more power converter designs.

The surrogate model repository 230 may comprise, but not limited to, at least one of: the one or more first-box models 234, the one or more second-box models 232, and one or more third-box models 236, used for optimization during the design process. The one or more first-box models 234 are configured to be trained on historical power converter design data and leverage data-driven artificial intelligence (AI) models to generate optimized design suggestions. The data-driven AI models may include, but not constricted to, at least one of: a) neural network regression models configured to predict optimal circuit parameter values based on historical design patterns and performance datasets, b) decision tree ensembles configured to classify and recommend suitable one or more power converter designs by learning from labeled design success cases, c) clustering models configured to group design variants with similar performance characteristics for design space exploration and optimization, and the like.

The one or more second-box models 232 are configured with physics-informed AI models that combine theoretical domain knowledge with empirical data to enhance prediction results accuracy for important circuit parameters, including circuit performance, electromagnetic interference (EMI) analysis, and thermal dissipation. The physics-informed AI models may include, but not constricted to, at least one of: a) physics-guided neural networks configured to model circuit behavior by embedding Kirchhoff's laws into a learning process for accurate performance predictions, b) thermal-aware AI models configured to estimate heat dissipation and thermal distribution in power converter layouts using combined simulation data and thermodynamic equations, c) electromagnetic field-informed models configured to predict EMI effects by integrating Maxwell's equations with historical EMI datasets to improve compliance and layout decisions, and the like.

The one or more third-box models 236 are configured to represent at least one of: one or more physical models and one or more mathematical models of the one or more power converters, including at least one of: analytical equations, state-space models, and frequency-domain representations. At least one of: the one or more first-box models 234, the one or more second-box models 232, and the one or more third-box models 236 contribute to a comprehensive surrogate model repository 230, ensuring a balance of accuracy, explainability, and physical fidelity in the design and validation workflows.

In an exemplary embodiment, the task execution subsystem 216 is configured to execute at least one design workflow within the determined one or more design workflows, based on the extracted one or more parameters. The task execution subsystem 216 is further configured with the one or more MLLMs, which enable the handling of both text and design-specific data, such as schematics, simulations, and numerical parameters. The at least one design workflow selected for execution is a structured step that guides the automatic creation and refinement of the one or more power converter designs. The at least one design workflow is tailored in real time by interpreting user intent, technical requirements, and context from the multimodal knowledge base 244, ensuring adaptive and intelligent execution. Each execution is context-aware and configured to align with high-performance design criteria. The execution of the at least one design workflow further comprises triggering at least one of: the design generation subsystem 218, the power converter validation subsystem 220, and the model fine-tuning subsystem 222.

In one of execution paths, the design generation subsystem 218 is configured to generate the one or more power converter designs using the retrieved one or more similar document chunks. The generation process incorporates insights derived from previous successful one or more power converter designs and leverages the surrogate model repository 230 to adaptively optimize the one or more power converter designs using one or more meta-heuristic optimization models. The one or more meta-heuristic optimization models are configured to intelligently explore the design space and refine the design results. The one or more meta-heuristic optimization models are configured to determine the design outcomes that comprise, but not constricted to, at least one of: circuit parameter values, control strategies and values, modulation parameter values, and the component selections.

The design generation subsystem 218 further optimizes the generated one or more power converter designs based on one or more performance metrics. The one or more performance metrics include, but limited to, at least one of: current stress (limiting current-related damage), zero-voltage switching (ZVS) and zero-current switching (ZCS) ranges (enhancing switching efficiency), reactive power (improving power factor), efficiency (ensuring minimal loss), reverse current (protecting components), direct current (DC) bias (ensuring voltage stability), output voltage and current ripple (minimizing fluctuations), and transient response (achieving rapid adaptation to changes). The one or more performance metrics are configured to contribute toward building a reliable and energy-efficient power converter design.

The one or more meta-heuristic optimization models are then applied to optimize the one or more design parameters, to meet the design requirements. The surrogate model repository 230 is configured to estimate behavior of the generated one or more power converter designs.

Another execution path involves the power converter validation subsystem 220, which is configured to validate the generated one or more power converter designs through simulation. The simulation validation of workflow 2 (240) is initiated. The workflow 2 (240) is triggered only after the workflow 1 (238) is completed, based on the user-provided textual information and the one or more design outcomes generated in the workflow 1 (238). The power converter validation subsystem 220 is configured to analyze the generated one or more power converter designs using one or more pre-defined simulation repositories to generate the simulation results to evaluate the circuit performance. The one or more pre-defined simulation repositories are launched to build and run an appropriate simulation model. This process outputs the simulation results such as, but not limited to, at least one of: circuit voltage waveforms, current waveforms, thermal simulation cloud maps, and electromagnetic simulation cloud maps, efficiency prediction, current stress prediction, and the like.

The power converter validation subsystem 220 uses the one or more pre-defined simulation repositories that store test conditions, waveform libraries, and benchmarking setups to evaluate the one or more power converter designs against expected performance standards. The simulation validation ensures that the generated one or more power converter designs may behave as intended in real-world conditions before actual implementation.

In an exemplary embodiment, for model fine-tuning, Workflow 3 (242) is initiated for fine-tuning. In a further execution step, the model fine-tuning subsystem 222 is configured to refine at least one of: the one or more first-box models 234 and the one or more second-box models 232 housed in the surrogate model repository 230. Fine-tuning is achieved by utilizing the real-time power converter design data to generate the prediction results. By continuously refining at least one of: the one or more first-box models 234 and the one or more second-box models 232, the system 102 remains adaptive to new data and evolving user needs, thus providing a feedback loop for continuous improvement and intelligent design evolution.

The one or more pre-defined simulation repositories include one or more auto-initialization of power electronics simulation tools. The one or more auto-initialization of power electronics simulation tools comprise, but not restricted to, at least one of: one or more circuit-level simulation tools, one or more multi-physics simulation tools, and one or more finite element analysis (FEA) tools, comprising, but not limited to, Simulink®, Piecewise Linear Electrical Circuit Simulation (PLECS®), and Physical Security Information Management (PSIM®), Computer Modeling Software (COMSOL®), ANSYS®, and Simulation Scale (SIMSCALE®).

The one or more circuit-level simulation tools are configured to evaluate the circuit performance of the generated one or more power converter designs. The one or more multi-physics simulation tools are configured to perform, but not limited to, at least one of: a thermal analysis, an electromagnetic analysis, and a mechanical analysis. The one or more FEA tools are configured to determine physical interactions within one or more components associated with the one or more power converters.

In an exemplary embodiment, the data visualizing subsystem 224 is configured to visualize at least one of: the design outcomes, the simulation results, and the prediction results to the user, wherein the visualization is tailored to assist in interpreting complex data related to the power converter design process.

The data visualizing subsystem 224 is further configured to at least one of: a) provide the component selections within the generated one or more power converter designs, thereby enabling the user to understand and validate the specific components chosen by the system 102 based on technical requirements and performance goals, b) compare multiple design variations of the one or more power converters, allowing the user to evaluate alternative designs, component configurations, and control strategies for trade-offs in efficiency, switching losses, thermal performance, and cost, and c) display power converter performance metrics such as current stress, zero-voltage and zero-current switching ranges, reactive power, efficiency, and output ripple, providing an intuitive view of how each power converter design performs under different operating conditions. By aggregating and presenting this information visually, the data visualizing subsystem 224 enables informed decision-making and supports an iterative refinement process to generate the optimized power converter design, tailored to the specific requirements and constraints identified earlier in the workflows. The visualization of at least one of: the design outcomes, the simulation results, and the prediction results are combined with the semantic understanding capabilities of the one or more LLMs to provide meaningful insights and references for the subsequent power converter design of the user.

In another exemplary embodiment, the one or more MLLMs are able to generate the one or more power converter designs for dual active bridge converters and buck converters. It should be understood by those skilled in the art that the embodiments of the system 102 may be provided as a method, system, or computer program product. The solutions described in the embodiments of this disclosure may be implemented using various programming languages, such as MATLAB, Python, C++, Java, and others. The one or more pre-defined simulation repositories used in the embodiments of this disclosure may include commonly used software for power converter simulations, such as MATLAB, PLECS, and the like.

Figure 3:
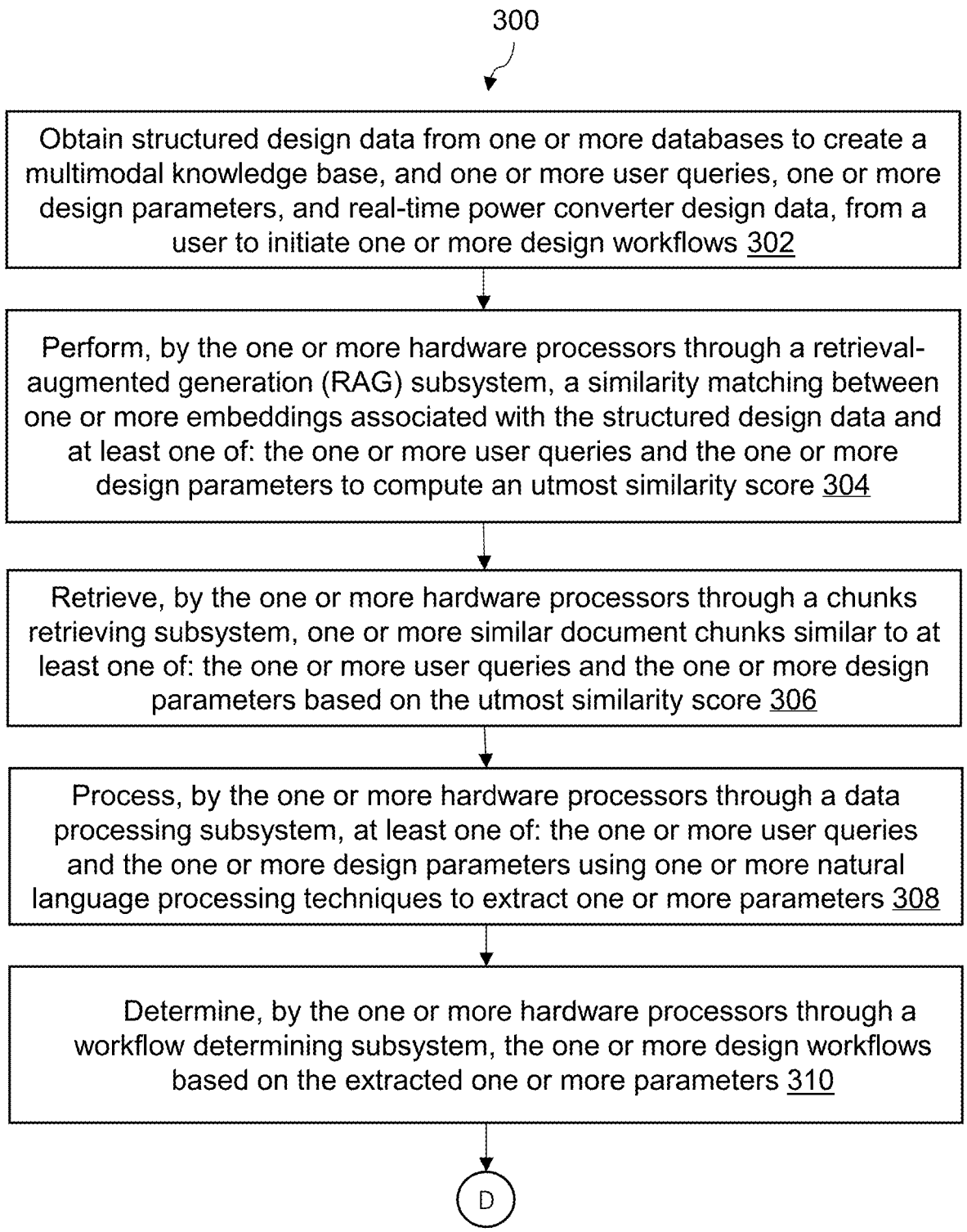
FIG. 3 illustrates an exemplary flowchart of a method for generating the optimized power converter design based on the one or more MLLMs, in accordance with an embodiment of the present disclosure.
Figure 3:
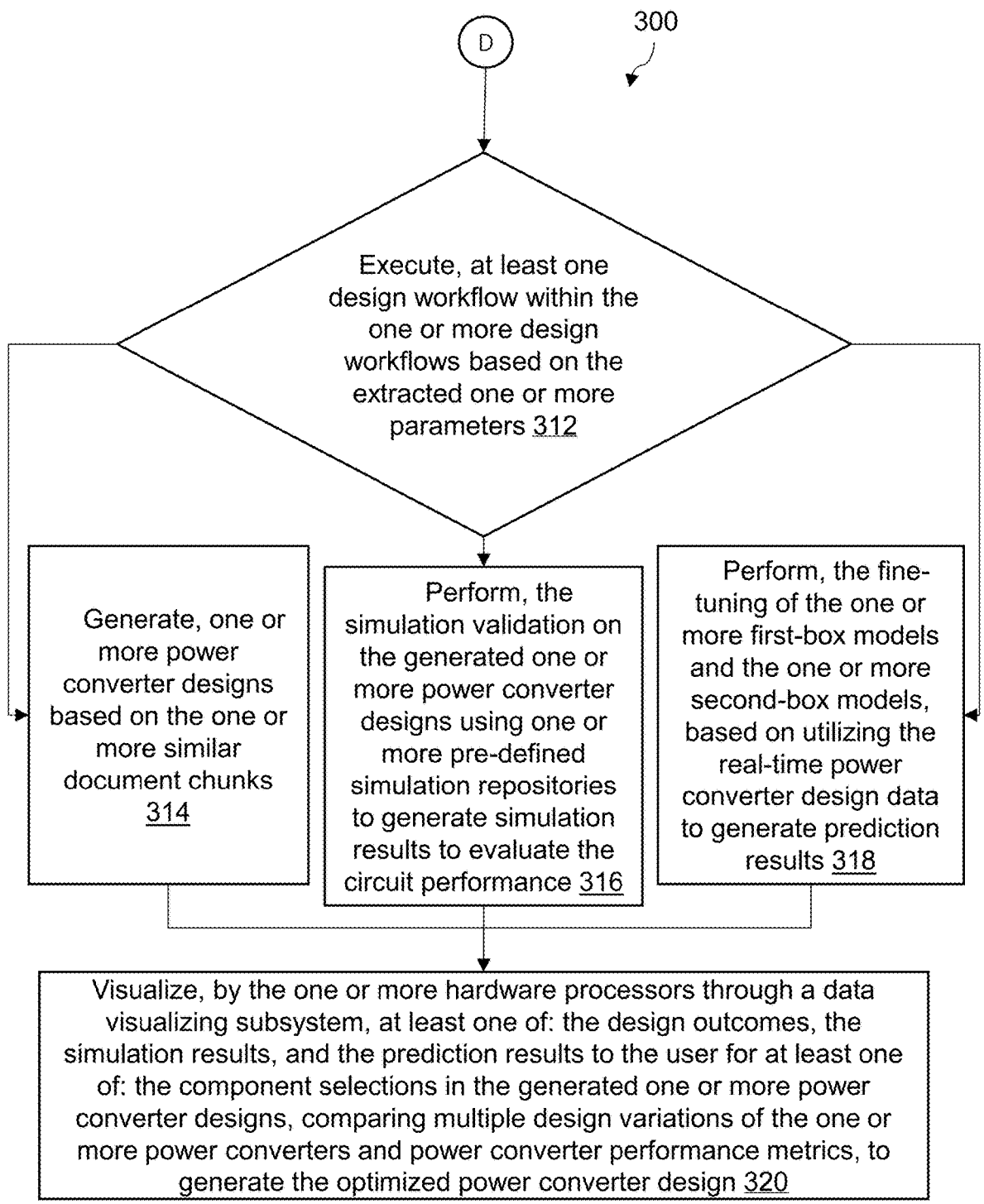

FIG. 3 illustrates an exemplary flowchart of a method 300 for generating the optimized power converter design based on the one or more MLLMs, in accordance with an embodiment of the present disclosure.

According to another exemplary embodiment of the disclosure, the method 300 for generating the optimized power converter design based on the one or more MLLMs is disclosed. At step 302, the method 300 involves obtaining at least one of: the structured design data to create the multimodal knowledge base and at least one of: the one or more user queries, the one or more design parameters, and the real-time power converter design data, from the user through the user interface to initiate the one or more design workflows. The structured design data is retrieved from the one or more databases 104 to facilitate analysis and processing. The structured design data may comprise, but not limited to, at least one of: the predefined circuit schematics, the component libraries, the control strategies, the historical performance data, the academic papers, the techno-legal documents, the technical documents, the datasheets, the research papers, the simulation logs, the modulation strategies, the design constraints, the waveform signal data, and the like. The real-time power converter design data, including, but not constrained to, at least one of: the time-series waveform data, the tabular performance data, and the like, is configured to fine-tune the one or more LLMs.

At step 304, the method 300 includes performing, by the one or more hardware processors through the RAG subsystem, the similarity matching between the one or more embeddings associated with the structured design data and at least one of: the one or more user queries and the one or more design parameters. The RAG subsystem is configured to compute the utmost similarity score by evaluating the closeness of semantic meaning between the structured design data and at least one of: the one or more user queries and the one or more design parameters. The similarity matching is achieved by comparing the one or more document embeddings and the one or more query embeddings using vector-based similarity metrics, enabling the system to retrieve the most contextually relevant design information for the next stage in the workflow.

At step 306, the method 300 includes retrieving, by the one or more hardware processors through the chunks retrieving subsystem, the one or more similar document chunks analogous to at least one of: the one or more user queries and the one or more design parameters. The chunks retrieving subsystem is configured to utilize the utmost similarity score computed by the RAG subsystem to identify and retrieve the most relevant sections and fragments of the structured design data.

At step 308, the method 300 includes processing, by the one or more hardware processors through the data processing subsystem, at least one of: the one or more user queries and the one or more design parameters using the one or more NLP techniques. The data processing subsystem is configured to analyze and interpret a linguistic structure and semantic meaning of the input text. The NLP techniques are configured to extract the one or more parameters that are essential for understanding the user intent and driving subsequent stages in the power converter design workflow. The one or more parameters may comprise, but not restricted to, at least one of: the one or more technical keywords, the one or more numerical values, the one or more waveform features, the one or more circuit design constraints, and the like.

At step 310, the method 300 includes determining, by the one or more hardware processors through the workflow determining subsystem, the one or more design workflows based on the extracted one or more parameters. The workflow determining subsystem is configured to analyze the extracted one or more parameters to identify optimal one or more design workflows. The one or more design workflows may comprise, but not limited to, at least one of: the generation of the one or more power converter designs, the simulation validation for evaluating the circuit performance, and the fine-tuning at least one of: the one or more first-box models and the one or more second-box models associated with the surrogate model repository, to continuously optimize the one or more power converter designs based on both data-driven and physics-informed AI approaches.

At step 312, the method 300 includes executing, by the one or more hardware processors through the task execution subsystem configured with the one or more MLLMs, the at least one design workflow within the one or more design workflows based on the extracted one or more parameters. The task execution subsystem is configured to intelligently automate tasks such as design generation, simulation, and optimization. The task execution subsystem leverages the one or more MLLMs to understand technical inputs and adapt workflows accordingly. This ensures efficient and accurate execution of the power converter design processes.

At step 314, the method 300 includes generating, by the one or more hardware processors through the design generation subsystem, the one or more power converter designs based on the one or more similar document chunks. The design generation subsystem is configured to synthesize new circuit designs using retrieved data such as the component specifications, the circuit topologies, and the performance optimization strategies. The generated one or more power converter designs are optimized by adapting the one or more meta-heuristic optimization models using the surrogate model repository to determine the design outcomes. The design outcomes may comprise, but not limited to, at least one of: the circuit parameter values, the control strategies and values, the modulation parameter values, and the component selections. The generated one or more power converter designs aim to achieve optimal efficiency, reduced switching losses, and improved reliability.

At step 316, the method 300 includes performing, by the one or more hardware processors through the power converter validation subsystem, the simulation validation on the generated one or more power converter designs using the one or more pre-defined simulation repositories to generate the simulation results to evaluate the circuit performance. The power converter validation subsystem is configured to simulate real-world electrical conditions and evaluate the behavior of the circuit under various operational scenarios. The power converter validation subsystem uses the one or more pre-defined simulation repositories containing validated models and test environments to ensure accurate simulation.

At step 318, the method 300 includes performing, by the one or more hardware processors through the model fine-tuning subsystem, the fine-tuning of at least one of: the one or more first-box models and the one or more second-box models associated with the surrogate model repository. The fine-tuning is based on utilizing the real-time power converter design data to generate the prediction results. The one or more first-box models are the data-driven AI models trained on historical design data, while the one or more second-box models are the physics-informed AI models to enhance prediction accuracy. This enables continuous optimization of circuit performance and design outcomes.

At step 320, the method 300 includes visualizing, by the one or more hardware processors through the data visualizing subsystem, at least one of: the design outcomes, the simulation results, and the prediction results to the user. The visualization is configured to assist in, but not constrained to, at least one of: selecting the components in the generated one or more power converter designs, comparing the multiple design variations of the one or more power converters, and analyzing the power converter performance metrics. This enables the user to make informed decisions to generate the optimized one or more power converter designs.

Figure 4:
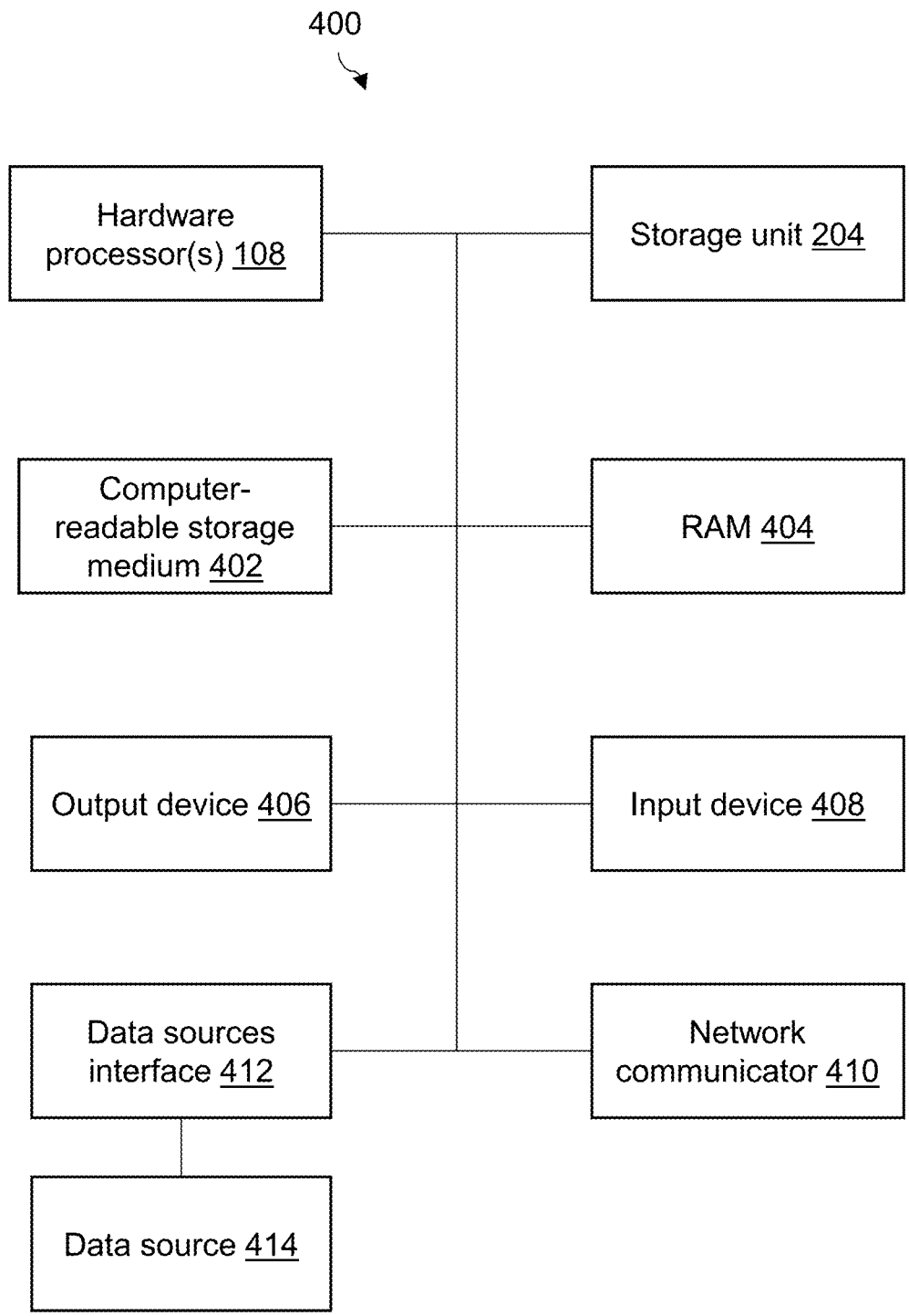
FIG. 4 illustrates an exemplary block diagram representation of one or more server platforms for implementation of the disclosed system, in accordance with an embodiment of the present disclosure.

FIG. 4 illustrates an exemplary block diagram representation of one or more server platforms 400 for implementation of the disclosed system 102, in accordance with an embodiment of the present disclosure.

In an exemplary embodiment, for the sake of brevity, the construction, and operational features of the system 102 which are explained in detail above are not explained in detail herein. Particularly, computing machines such as but not limited to internal/external server clusters, quantum computers, desktops, laptops, smartphones, tablets, and wearables may be used to execute the system 102 or may include the structure of the one or more server platforms 400. As illustrated, the one or more server platforms 400 may include additional components not shown, and some of the components described may be removed and/or modified. For example, a computer system with the multiple graphics processing units (GPUs) may be located on at least one of: internal printed circuit boards (PCBs) and external-cloud platforms including Amazon® Web Services (AWS), Google® Cloud Platform (GCP) Microsoft® Azure (Azure), internal corporate cloud computing clusters, or organizational computing resources.

The one or more server platforms 400 may be a computer system such as the system 102 that may be used with the embodiments described herein. The computer system may represent a computational platform that includes components that may be on the one or more servers or another computer system. The computer system may be executed by the one or more hardware processors 108 (e.g., single, or multiple processors) or other hardware processing circuits, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the one or more hardware processors 108 that execute software instructions or code stored on a non-transitory computer-readable storage medium 402 to perform methods of the present disclosure. The software code includes, for example, instructions to gather data and analyze the instructions in the plurality of subsystems 112. For example, the plurality of subsystems 112 includes the data obtaining subsystem 206, the RAG subsystem 208, the chunks retrieving subsystem 210, the data processing subsystem 212, the workflow determining subsystem 214, the task execution subsystem 216, the design generation subsystem 218, the power converter validation subsystem 220, the model fine-tuning subsystem 222, and the data visualizing subsystem 224.

The instructions on the computer-readable storage medium 402 are read and store the instructions in the storage unit 204 or random-access memory (RAM) 404. The storage unit 204 may provide a space for keeping static data where at least some instructions could be stored for later execution. The stored instructions may be further compiled to generate other representations of the instructions and dynamically stored in the RAM 404. The one or more hardware processors 108 may read instructions from the RAM 404 and perform actions as instructed.

The computer system may further include an output device 406 to provide at least some of the results of the execution as output including, but not limited to, visual at least one of: the design outcomes, the simulation results, and the prediction results to the user. The output device 406 may include a display on computing devices and virtual reality glasses. For example, the display may be a mobile phone screen or a laptop screen. Graphical user interfaces (GUIs) and/or text may be presented as an output on the display screen. The computer system may further include an input device 408 to provide the user or another device with mechanisms for entering data and/or otherwise interacting with the computer system. The input device 408 may include, for example, a keyboard, a keypad, a mouse, or a touchscreen. Each of the output devices 406 and the input device 408 may be joined by one or more additional peripherals.

A network communicator 410 may be provided to connect the computer system to a network and in turn to other devices connected to the network including other entities, servers, data stores, and interfaces. The network communicator 410 may include, for example, a network adapter such as a LAN adapter or a wireless adapter. The computer system may include a data sources interface 412 to access a data source 414. The data source 414 may be an information resource about the datasheets, electrical specifications, and the thermal ratings of power semiconductors, the MOSFETs, the IGBTs, the diodes, the capacitors, the inductors, and the like. As an example, the one or more databases 104 of exceptions and rules may be provided as the data source 414. Moreover, knowledge repositories and curated data may be other examples of the data source 414. The data source 414 may include libraries containing, but not limited to, component libraries & manufacturer databases, circuit design repositories, standards & regulatory databases, simulation & benchmarking repositories, research & technical paper databases, patent & intellectual property databases, engineering forums & technical blogs, time-series waveform & experimental data repositories, and the like. Additionally, the data source 414 may encompass information repositories and curated data sets that are critical for enabling the system 102 to generate the optimized design of the one or more power converters.

Numerous advantages of the present disclosure may be apparent from the discussion above. In accordance with the present disclosure, the method and the system for generating the optimized one or more power converter designs based on the one or more MLLMs are disclosed. The system eliminates manual design iterations by leveraging retrieval-based AI techniques to generate the optimized one or more power converter designs based on the historical data and real-time design constraints. By integrating the structured design data and real-time performance metrics, the system enhances decision-making for design selection and optimization.

The use of the one or more data-driven AI models and the one or more meta-heuristic optimization models enables intelligent tuning of circuit parameters, control strategies, modulation techniques, and component selections for improved efficiency and reliability. The system auto-initializes circuit-level and multi-physics simulation tools to perform electromagnetic, thermal, and mechanical analyses, ensuring accurate performance predictions. By integrating MLLM fine-tuning based on real-time waveform and the tabular performance data, the system continuously improves prediction accuracy and adapts to evolving power converter requirements. The system provides interactive visualization tools for comparing multiple design variations, enabling the user to refine circuit constraints and optimize the power converter performance metrics efficiently. The framework is applicable across various power converter designs, including Direct current (DC)-DC converters, inverters, resonant converters, and multi-level power systems, making the system suitable for diverse applications such as electric vehicles, renewable energy systems, and industrial power supplies.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising", "having", "containing", and "including", and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a", "an", and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A method for generating an optimized power converter design based on one or more multimodal large language models (MLLMs), comprising:
    obtaining, by one or more hardware processors through a data obtaining subsystem,
        structured design data related to one or more power converters from one or more databases to create a multimodal knowledge base; and
        at least one of: one or more user queries, one or more design parameters, and real-time power converter design data, from a user associated with a user profile through a user interface to initiate one or more design workflows,
        the real-time power converter design data including at least one of: time-series waveform data and tabular performance data, configured to fine-tune one or more large language models (LLMs);
    performing, by the one or more hardware processors through a retrieval-augmented generation (RAG) subsystem, a similarity matching between one or more embeddings associated with the structured design data and at least one of: the one or more user queries and the one or more design parameters to compute an utmost similarity score;
    retrieving, by the one or more hardware processors through a chunks retrieving subsystem, one or more similar document chunks similar to at least one of: the one or more user queries and the one or more design parameters based on the utmost similarity score;
    processing, by the one or more hardware processors through a data processing subsystem, at least one of: the one or more user queries and the one or more design parameters using one or more natural language processing techniques to extract one or more parameters,
        the one or more parameters comprise at least one of: one or more technical keywords, one or more numerical values, one or more waveform features, and one or more circuit design constraints;
    determining, by the one or more hardware processors through a workflow determining subsystem, the one or more design workflows based on the extracted one or more parameters,
        the one or more design workflows comprise at least one of: generation of one or more power converter designs, simulation validation for evaluating circuit performance, and fine-tuning at least one of: one or more first-box models and one or more second-box models associated with a surrogate model repository, for continuous optimization;
    executing, by the one or more hardware processors through a task execution subsystem configured with the one or more multimodal large language models (MLLMs), at least one design workflow within the one or more design workflows based on the extracted one or more parameters,
        wherein the executing at least one design workflow further comprising at least one of:
            generating, by the one or more hardware processors through a design generation subsystem, the one or more power converter designs based on the one or more similar document chunks,
                wherein optimizing the generated one or more power converter designs by adapting one or more meta-heuristic optimization models using the surrogate model repository to determine design outcomes comprise at least one of: circuit parameter values, control strategies and values, modulation parameter values, and component selections;
            performing, by the one or more hardware processors through a power converter validation subsystem, the simulation validation on the generated one or more power converter designs using one or more pre-defined simulation repositories to generate simulation results to evaluate the circuit performance; and performing, by the one or more hardware processors through a model fine-tuning subsystem, the fine-tuning of at least one of: the one or more first-box models and the one or more second-box models associated with the surrogate model repository, based on utilizing the real-time power converter design data to generate prediction results; and visualizing, by the one or more hardware processors through a data visualizing subsystem, at least one of: the design outcomes, the simulation results, and the prediction results to the user for at least one of: the component selections in the generated one or more power converter designs, comparing multiple design variations of the one or more power converters and power converter performance metrics, to generate the optimized power converter design.

2. The method of claim 1, wherein obtaining the structured design data comprises at least one of: predefined circuit schematics, component libraries, control strategies, and historical performance data, academic papers, techno-legal documents, technical documents, datasheets, research papers, simulation logs, modulation strategies, design constraints, and waveform signal data.

3. The method of claim 1, wherein
the one or more user queries comprise at least one of: requests for executing the one or more design workflows, comparing multiple circuit configurations for performance evaluation, selecting the optimal component selections for the one or more power converter objectives and constraints, and generating predictive insights on a performance based on the simulation results; and
the one or more design parameters comprise at least one of: power level, efficiency requirements, switching frequency constraints, voltage and current ratings, load characteristics and dynamic response requirements, thermal dissipation limits, control strategies and modulation techniques, and the one or more circuit design constraints.

4. The method of claim 1, wherein the data obtaining subsystem further comprising:
processing at least one of: the structured design data and the real-time power converter design data using at least one of: embedding techniques and chunking mechanisms to generate a document vector database with one or more document embeddings for efficient retrieval and analysis; and
processing at least one of: the one or more user queries and the one or more design parameters using the embedding techniques to generate a query vector database with one or more query embeddings.

5. The method of claim 1, wherein performing the similarity matching between the one or more embeddings comprising:
performing the similarity matching between the one or more document embeddings and the one or more query embeddings using at least one of: cosine similarity procedures, Jaccard similarity procedures, levenshtein distance procedures, and correlation procedures to compute the utmost similarity score, thereby retrieving the one or more similar document chunks,
the one or more similar document chunks comprise component specifications and characteristics, circuit topologies and design principles, simulation models and validation data, performance metrics and optimization techniques, and application-specific information.

6. The method of claim 1, wherein the one or more large language models (LLMs) are executed using at least one of: a generative pre-trained transformer (GPT)-3.5, a generative pre-trained transformer (GPT)-4, and one or more systems using a large language model (LLM) with a transformer architecture.

7. The method of claim 1, wherein optimizing the design of the one or more power converters based on one or more performance metrics,
the one or more performance metrics comprise at least one of: current stress, zero-voltage switching range, zero-current switching range, reactive power, efficiency, reverse current, direct current (DC) bias, output voltage ripple, output current ripple, and transient response.

8. The method of claim 1, wherein the surrogate model repository comprises at least one of:
the one or more first-box models trained on the historical power converters design data, configured to leverage one or more data-driven artificial intelligence (AI) models to generate the optimized design of the one or more power converters;
the one or more second-box models configured with physics-informed artificial intelligence (AI) models to optimize the prediction results accuracy for circuit performance, an electromagnetic interference (EMI) analysis, and a thermal dissipation; and
one or more third-box models configured to represent at least one of: one or more physical models and one or more mathematical models of the one or more power converters, including at least one of: analytical equations, state-space models, and frequency-domain representations.

9. The method of claim 1, wherein the one or more pre-defined simulation repositories include one or more auto-initialization of power electronics simulation tools,
the one or more auto-initialization of power electronics simulation tools comprise at least one of:
one or more circuit-level simulation tools configured to evaluate the circuit performance of the generated one or more power converters;
one or more multi-physics simulation tools configured to perform at least one of: a thermal analysis, an electromagnetic analysis, and a mechanical analysis; and
one or more finite element analysis (FEA) tools configured to determine physical interactions within one or more components associated with the one or more power converters.

10. A system for generating an optimized power converter design based on one or more multimodal large language models (MLLMs), comprising:
one or more hardware processors; and
a memory unit coupled to the one or more hardware processors, wherein the memory unit comprises a plurality of subsystems in form of programmable instructions executable by the one or more hardware processors, and wherein the plurality of subsystems comprises:
a data obtaining subsystem configured to obtain:
structured design data related to one or more power converters from one or more databases to create a multimodal knowledge base;
at least one of: one or more user queries, one or more design parameters, and real-time power converter design data, from a user associated with a user profile through a user interface to initiate one or more design workflows;

the real-time power converter design data including at least one of: time-series waveform data and tabular performance data, configured to fine-tune one or more large language models (LLMs);

a retrieval-augmented generation (RAG) subsystem configured to perform a similarity matching between one or more embeddings associated with the structured design data and at least one of: the one or more user queries and the one or more design parameters to compute an utmost similarity score;

a chunks retrieving subsystem configured to retrieve one or more similar document chunks similar to at least one of: the one or more user queries and the one or more design parameters based on the utmost similarity score;

a data processing subsystem configured to process at least one of: the one or more user queries and the one or more design parameters using one or more natural language processing techniques to extract one or more parameters, the one or more parameters comprise at least one of: one or more technical keywords, one or more numerical values, one or more waveform features, and one or more circuit design constraints;

a workflow determining subsystem configured to determine the one or more design workflows based on the extracted one or more parameters, the one or more design workflows comprise at least one of: generation of one or more power converter designs, simulation validation for evaluating circuit performance, and fine-tuning at least one of: one or more first-box models and one or more second-box models associated with a surrogate model repository, for continuous optimization;

a task execution subsystem configured with the one or more multimodal large language models (MLLMs) to execute at least one design workflow within the one or more design workflows based on the extracted one or more parameters, wherein the executing at least one design workflow further comprising at least one of:

a design generation subsystem configured to generate the one or more power converter designs based on the one or more similar document chunks, wherein optimizing the generated one or more power converter designs by adapting one or more meta-heuristic optimization models using the surrogate model repository to determine design outcomes comprise at least one of: circuit parameter values, control strategies and values, modulation parameter values, and component selections;

a power converter validation subsystem configured to perform the simulation validation on the generated one or more power converter designs using one or more pre-defined simulation repositories to generate simulation results to evaluate the circuit performance; and a model fine-tuning subsystem configured to perform the fine-tuning of at least one of: the one or more first-box models and the one or more second-box models associated with the surrogate model repository, based on utilizing the real-time power converter design data to generate prediction results; and a data visualizing subsystem configured to visualize at least one of: the design outcomes, the simulation results, and the prediction results to the user for at least one of: the component selections in the generated one or more power converter designs, comparing multiple design variations of the one or more power converters and power converter performance metrics, to generate the optimized power converter design.

11. The system of claim 10, wherein the structured design data comprises at least one of: predefined circuit schematics, component libraries, control strategies, historical performance data, academic papers, techno-legal documents, technical documents, datasheets, research papers, simulation logs, modulation strategies, design constraints, and waveform signal data.

12. The system of claim 10, wherein the one or more user queries comprise at least one of: requests for executing the one or more design workflows, comparing multiple circuit configurations for performance evaluation, selecting the optimal component selections for the one or more power converter objectives and constraints, and generating predictive insights on a performance based on the simulation results; and the one or more design parameters comprise at least one of: power level, efficiency requirements, switching frequency constraints, voltage and current ratings, load characteristics and dynamic response requirements, thermal dissipation limits, control strategies and modulation techniques, and the one or more circuit design constraints.

13. The system of claim 10, wherein the data obtaining subsystem configured to:

process at least one of: the structured design data and the real-time power converter design data using at least one of: embedding techniques and chunking mechanisms to generate a document vector database with one or more document embeddings for efficient retrieval and analysis; and process at least one of: the one or more user queries and the one or more design parameters using the embedding techniques to generate a query vector database with one or more query embeddings.

14. The system of claim 10, wherein the retrieval-augmented generation (RAG) subsystem is configured to perform the similarity matching between the one or more document embeddings and the one or more query embeddings using at least one of: cosine similarity procedures, Jaccard similarity procedures, levenshtein distance procedures, and correlation procedures to compute the utmost similarity score, thereby retrieving the one or more similar document chunks, the one or more similar document chunks comprises component specifications and characteristics, circuit topologies and design principles, simulation models and validation data, performance metrics and optimization techniques, and application-specific information.

15. The system of claim 10, wherein the one or more large language models (LLMs) are executed using at least one of: a generative pre-trained transformer (GPT)-3.5, a generative pre-trained transformer (GPT)-4, and one or more systems using a large language model (LLM) with a transformer architecture.

16. The system of claim 10, wherein the power converter design optimized based on one or more performance metrics,
the one or more performance metrics comprise at least one of: current stress, zero-voltage switching range, zero-current switching range, reactive power, efficiency, reverse current, direct current (DC) bias, output voltage ripple, output current ripple, and transient response.

17. The system of claim 10, wherein the surrogate model repository comprises at least one of:
the one or more first-box models trained on the historical power converters design data, configured to leverage one or more data-driven artificial intelligence (AI) models to generate the optimized design of the one or more power converters;
the one or more second-box models configured with physics-informed artificial intelligence (AI) models to optimize the prediction results accuracy for circuit performance, an electromagnetic interference (EMI) analysis, and a thermal dissipation; and
one or more third-box models configured to represent at least one of: one or more physical models and one or more mathematical models of the one or more power converters, including at least one of: analytical equations, state-space models, and frequency-domain representations.

18. The system of claim 10, wherein the one or more pre-defined simulation repositories include one or more auto-initialization of power electronics simulation tools,
the one or more auto-initialization of power electronics simulation tools comprise at least one of:
one or more circuit-level simulation tools configured to evaluate the circuit performance of the generated one or more power converters;
one or more multi-physics simulation tools configured to perform at least one of: a thermal analysis, an electromagnetic analysis, and a mechanical analysis; and
one or more finite element analysis (FEA) tools configured to determine physical interactions within one or more components associated with the one or more power converters.

19. A non-transitory computer-readable storage medium storing computer-executable instructions that, when executed by one or more hardware processors, cause the one or more hardware processors to perform operations for generating an optimized power converter design based on one or more multimodal large language models (MLLMs), the operations comprising:
obtaining structured design data related to one or more power converters from one or more databases to create a multimodal knowledge base;
obtaining at least one of: one or more user queries, one or more design parameters, and real-time power converter design data, from a user associated with a user profile through a user interface to initiate one or more design workflows,
the real-time power converter design data including at least one of: time-series waveform data and tabular performance data, configured to fine-tune one or more large language models (LLMs);
performing a similarity matching between one or more embeddings associated with the structured design data and at least one of: the one or more user queries and the one or more design parameters to compute an utmost similarity score;
retrieving one or more similar document chunks similar to at least one of: the one or more user queries and the one or more design parameters based on the utmost similarity score;
processing at least one of: the one or more user queries and the one or more design parameters using one or more natural language processing techniques to extract one or more parameters,
the one or more parameters comprise at least one of: one or more technical keywords, one or more numerical values, one or more waveform features, and one or more circuit design constraints;
determining the one or more design workflows based on the extracted one or more parameters,
the one or more design workflows comprise at least one of: generation of one or more power converter designs, simulation validation for evaluating circuit performance, and fine-tuning at least one of: one or more first-box models and one or more second-box models associated with a surrogate model repository, for continuous optimization;
executing using the one or more multimodal large language models (MLLMs) at least one design workflow within the one or more design workflows based on the extracted one or more parameters,
wherein the executing at least one design workflow further comprising at least one of:
generating the one or more power converter designs based on the one or more similar document chunks,
wherein optimizing the generated one or more power converter designs by adapting one or more meta-heuristic optimization models using the surrogate model repository to determine design outcomes comprise at least one of: circuit parameter values, control strategies and values, modulation parameter values, and component selections;
performing the simulation validation on the generated one or more power converter designs using one or more pre-defined simulation repositories to generate simulation results to evaluate the circuit performance; and
performing the fine-tuning of at least one of: the one or more first-box models and the one or more second-box models associated with the surrogate model repository, based on utilizing the real-time power converter design data to generate prediction results; and
visualizing at least one of: the design outcomes, the simulation results, and the prediction results to the user for at least one of: the component selections in the generated one or more power converter designs, comparing multiple design variations of the one or more power converters and power converter performance metrics, to generate the optimized power converter design.

20. The non-transitory computer-readable storage medium of claim 19, wherein performing the similarity matching between one or more embeddings comprising:
processing at least one of: the structured design data and the real-time power converter design data using at least one of: embedding techniques and chunking mechanisms to generate a document vector database with one or more document embeddings for efficient retrieval and analysis;

processing at least one of: the one or more user queries and the one or more design parameters using the embedding techniques to generate a query vector database with one or more query embeddings; and performing the similarity matching between the one or more document embeddings and the one or more query embeddings using at least one of: cosine similarity procedures, Jaccard similarity procedures, levenshtein distance procedures, and correlation procedures to compute the utmost similarity score, thereby retrieving the one or more similar document chunks, the one or more similar document chunks comprises component specifications and characteristics, circuit topologies and design principles, simulation models and validation data, performance metrics and optimization techniques, and application-specific information.

* * * * *